US007243906B2

(12) United States Patent
Pagliarani

(10) Patent No.: US 7,243,906 B2
(45) Date of Patent: Jul. 17, 2007

(54) WHEELED JACK

(76) Inventor: Stefano Pagliarani, Strada Statale Adriatica, 3735/B, 47042 Cesenatico (IT)

( * ) Notice: Subject to any disclaimer, the term of this patent is extended or adjusted under 35 U.S.C. 154(b) by 0 days.

(21) Appl. No.: 11/451,390

(22) Filed: Jun. 13, 2006

(65) Prior Publication Data

US 2006/0284144 A1 Dec. 21, 2006

(30) Foreign Application Priority Data

Jun. 15, 2005 (IT) .......................... BO2005A0403

(51) Int. Cl.
*B60P 1/48* (2006.01)

(52) U.S. Cl. ...................................... 254/8 B; 254/2 B

(58) Field of Classification Search ................ 254/8 B, 254/2 B, 93 R, 4 B, 126, 4 R, 2 R
See application file for complete search history.

(56) References Cited

U.S. PATENT DOCUMENTS 4,190,233 A * 2/1980 Godfrey ..................... 254/4 B
6,199,826 B1 * 3/2001 Nix ............................ 254/8 B
6,416,039 B1 * 7/2002 Pietrusynski ................ 254/8 B
6,457,700 B1 * 10/2002 Hong .......................... 254/8 B
2005/0092973 A1 * 5/2005 Tatsumi ....................... 254/8 B
2006/0284144 A1 * 12/2006 Pagliarani ................... 254/8 B

* cited by examiner

*Primary Examiner*—Lee D. Wilson
(74) *Attorney, Agent, or Firm*—Modiano & Associati; Albert Josif; Daniel O'Byrne

(57) ABSTRACT

A wheeled jack, comprising a chassis shaped like an articulated parallelogram in which a lower horizontal side is provided, at its two front sides, with respective pairs of tilting wheels and the front end of the upper horizontal side is provided with an articulation for the centerline of a transverse arm for supporting clamps for gripping a pair of wheels of a vehicle, each one of the pairs of front tilting wheels being fitted at the ends of a rocker lever and able to swivel about vertical axes, the articulation of the transverse clamp-supporting arm being provided with an assembly for locking at different angles.

7 Claims, 6 Drawing Sheets

WHEELED JACK

The present invention relates to a wheeled jack.

BACKGROUND OF THE INVENTION

Wheeled jacks are used normally to attach, lift and carry motor vehicles for short stretches, especially inside car repair workshops and in any case when it is difficult to have direct access with a normal breakdown truck.

In the past, the Applicant has devised and patented a wheeled jack comprising a chassis which is predominantly longitudinally elongated and is provided with two rear wheels and two front wheels: said wheeled jack allows to work easily even on very low and very heavy motor vehicles. This known jack allows to reach even points of the motor vehicle that are not easily accessible. An object of said jack is to provide the wheeled jack with a coupling device, which allows to easily engage the motor vehicle by means of a pair of its wheels even when it is placed at a very short distance laterally with respect to a footpath, wall or other vehicle. Another object is to provide the jack with a motor vehicle engagement device by means of which it is possible to engage effectively the motor vehicle by means of a pair of its wheels in any orientation and/or regardless of their condition.

By continuing with experimentation, the Applicant has found some drawbacks in these last two aspects and has devised improvements which solve these problems effectively.

SUMMARY OF THE INVENTION

This aim and these and other objects which will become better apparent hereinafter are achieved by the present wheeled jack, of the type that comprises a chassis shaped like an articulated parallelogram in which a lower horizontal side is provided, at its two front sides, with respective pairs of tilting wheels and the front end of the upper horizontal side is provided with articulation means for the centerline of a transverse arm for supporting clamps for gripping a pair of wheels of the vehicle, characterized in that each one of the wheels of said pairs of front tilting wheels is fitted at the ends of a rocker lever and can swivel about vertical axes, and in that the articulation means of the transverse clamp-supporting arm are provided with an assembly for locking at different angles.

BRIEF DESCRIPTION OF THE DRAWINGS

Further characteristics and advantages of the invention will become better apparent from the following detailed description of a preferred but not exclusive embodiment of a wheeled jack according to the invention, illustrated by way of non-limiting example in the accompanying drawings, wherein.

DESCRIPTION OF THE PREFERRED EMBODIMENTS

Figure 1:
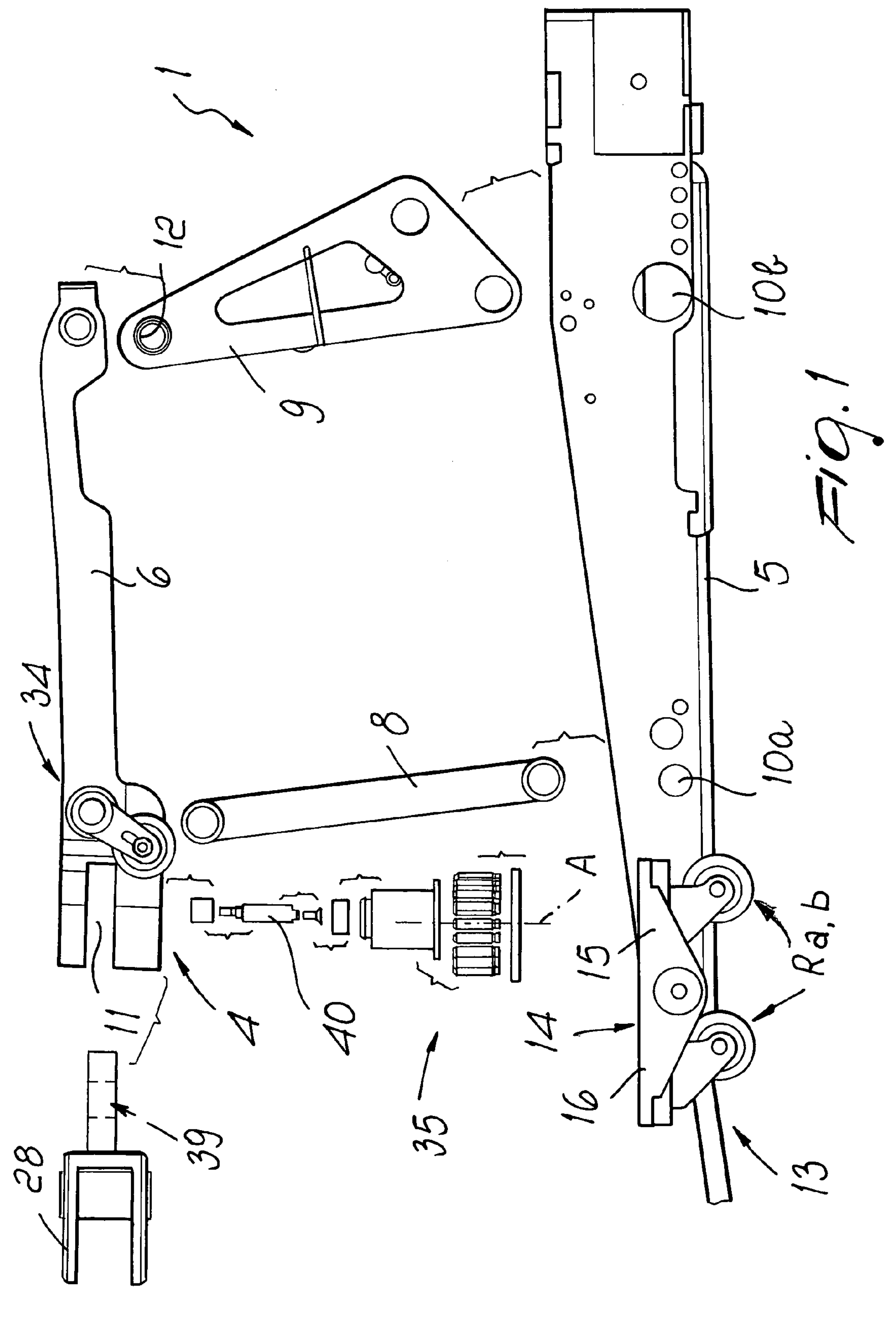
FIG. 1 is an exploded side view of the wheeled jack according to the invention.

With reference to the figures, the reference numeral 1 generally designates a wheeled jack according to the invention for lifting partially a motor vehicle.

The jack comprises a chassis 2, which has a limited vertical space occupation, two right front and rear wheels Ra,b and two left front and rear wheels Ra,b connected to the chassis, and a lifting device 3, which is functionally connected to the chassis and is provided with a working head 7 mounted at 4, which is suitable to interact with lower parts of the motor vehicle, such as the wheels, in order to grasp on them.

The lifting device 3 comprises an articulated parallelogram, in which a first side 5 coincides with a substantially horizontal portion of the chassis, a second side 6 is opposite and parallel to the first one and is provided with the working head 7 at a front end thereof, a third side 8 and a fourth side 9 are pivoted at one end by means of pivots at 10*a*, 10*b* of the side 5 of the chassis, and, at the opposite side, by means of pivots inserted at 11 and 12 respectively to the front end and to the rear end of the second side.

The lifting device can move between a first configuration, in which the second side 6 rests on the first side 5, with the working head arranged at a minimum height from the ground, and a second configuration, in which it is at least partially spaced from the first side 5, with the working head raised to a height which is greater than the minimum one.

The jack comprises a stabilizer, which balances the torques that tend to overturn the jack when, in the movement between the first and second configurations, the working head is still outside of the horizontal footprint of the chassis in front of the front wheels Ra, Rb. The stabilizer comprises a pair of stems 13 connected to a ram that lays longitudinally to the side 5.

In this manner it is possible to minimize the distance of the working head from the ground, and said head can thus be inserted even under vehicles whose lower part is very low, without the risk of overturning the jack when the working head starts to lift or stops lowering the load applied thereto and is still located in front of the front wheels.

The pairs of wheels Ra, Rb can be constituted by two corresponding tilting wheel pairs 14, in order to allow the jack to pass easily over small bumps in the ground. In this case, in the second configuration, the working head will be located at least behind the axis about which the front wheel pairs tilt.

Each pair of tilting wheels 14 comprises a rocker lever 15, which is pivoted by means of a pivot 16 in front of the side or arm 5 of the parallelogram: the lever 15 is advantageously provided in a folded metallic plate, which forms an upper flat face 17, which is substantially rectangular, and is extended downward on the two sides of the pair of wheels Ra, b with symmetric triangular flaps 18; two bolts 19*a*, 19*b* are screwed below the flat face 17 and support, with the interposition of bearings and spacers 20, 21, 22, respective forks 23*a*, 23*b*, with which respective front and rear wheels Ra, Rb are associated, with the hubs 25; the wheels Ra, Rb therefore swivel with respect to substantially vertical axes (of the bolts 19).

In a preferred embodiment of the invention, the lifting device has vertical dimensions which are entirely substantially contained within the vertical dimensions of the chassis.

Figure 2:
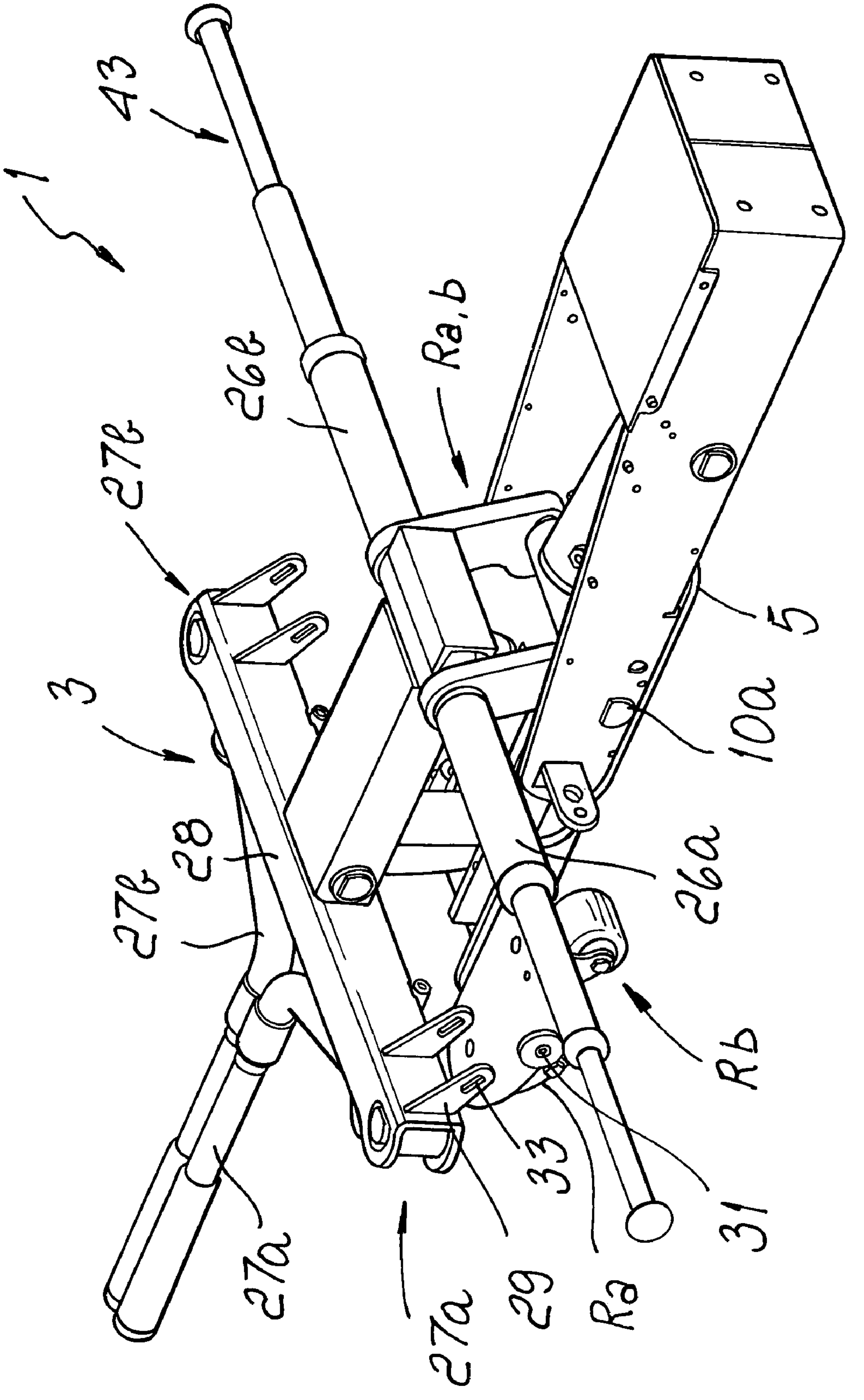
FIG. 2 is a front perspective view of the jack.
Figure 3:
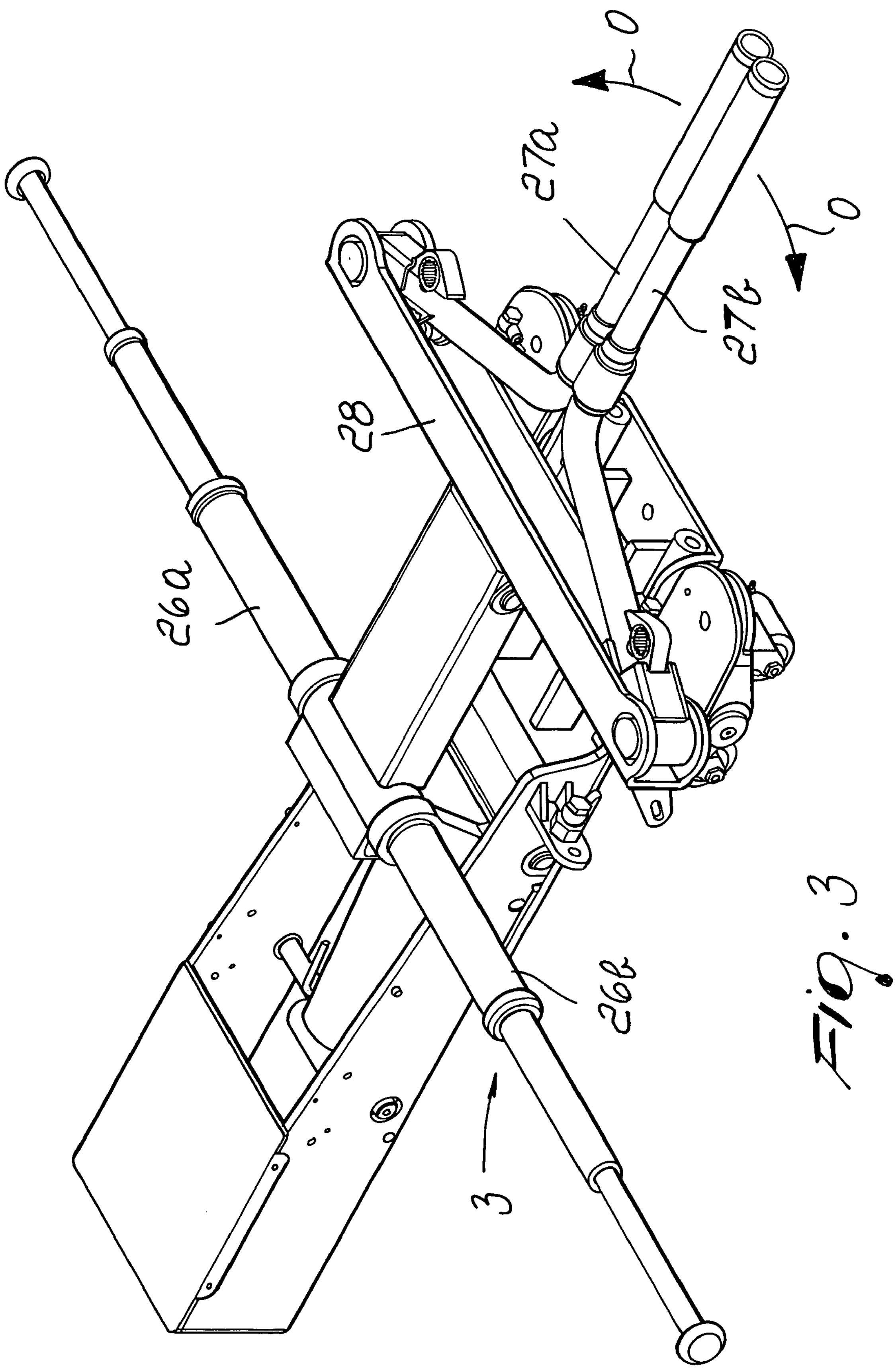
FIG. 3 is a rear perspective view of the jack.
Figure 4:
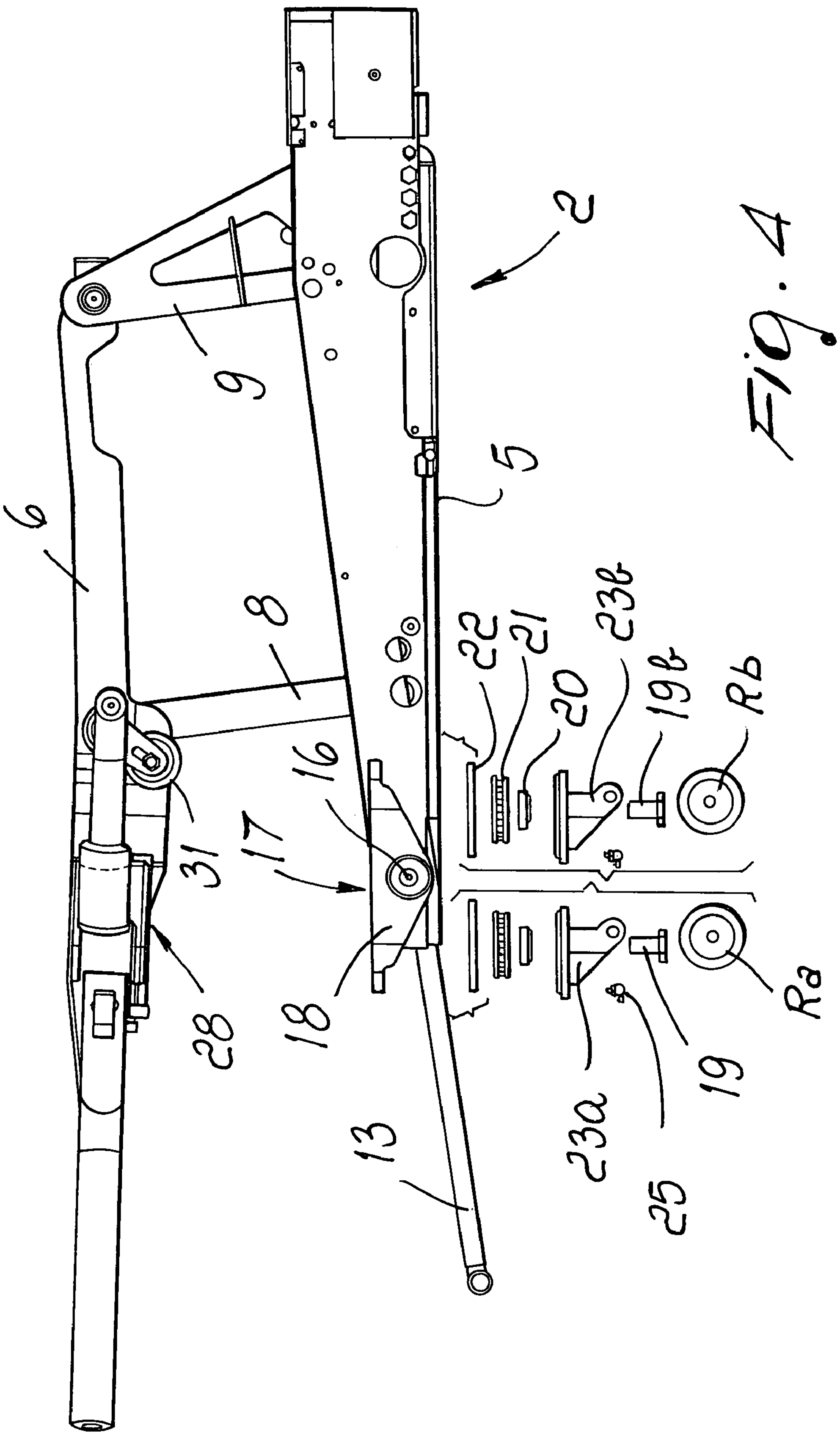
FIG. 4 is an exploded side view of the jack.

The Inventor has developed an innovative version of a jack with a working head 7 which allows easily to engage motor vehicles which are adjacent to a sidewalk at a short distance therefrom (or, in an extreme case, have the left side of the wheels in contact with said sidewalk), without having to perform many delicate maneuvers in order to approach correctly the parked vehicle. It facilitates enormously the alignment of said engagement device with the wheels of the motor vehicle. In a particular embodiment, it allows easily to engage uneven wheels and wheels which are damaged or severely axially offset by an accident. In particular, in the innovative engagement device described above, each coupling device comprises, laterally protruding from upper side 6 in an intermediate part thereof, a first abutment 26*a* and a second abutment 26*b* for the corresponding pair of front or rear wheels of the motor vehicle to be lifted/carried, which are connected functionally to the main body and cooperate with the respective ends of a corresponding clamp element 27*a*, 27*b*. The clamps 27*a*, 27*b* of the clamp element can move (see arrows 0 in FIG. 3) with respect to each other at least between a spaced position, in which the clamp element is open (see FIGS. 2 and 3), and a closer position, in which the clamp element is closed onto the corresponding wheel of the motor vehicle.

The clamps 27*a*, 27*b* are fitted to the lateral ends of a transverse arm 28, which is fitted, at it ends, with respective additional forks 29, 30 for the rotary mounting of respective secondary, supporting wheels 31 for ground support in the position of complete lowering. The hubs 32 of the supporting wheels 31 can be fixed along mutually opposite adjustment slots 33.

Figure 5:
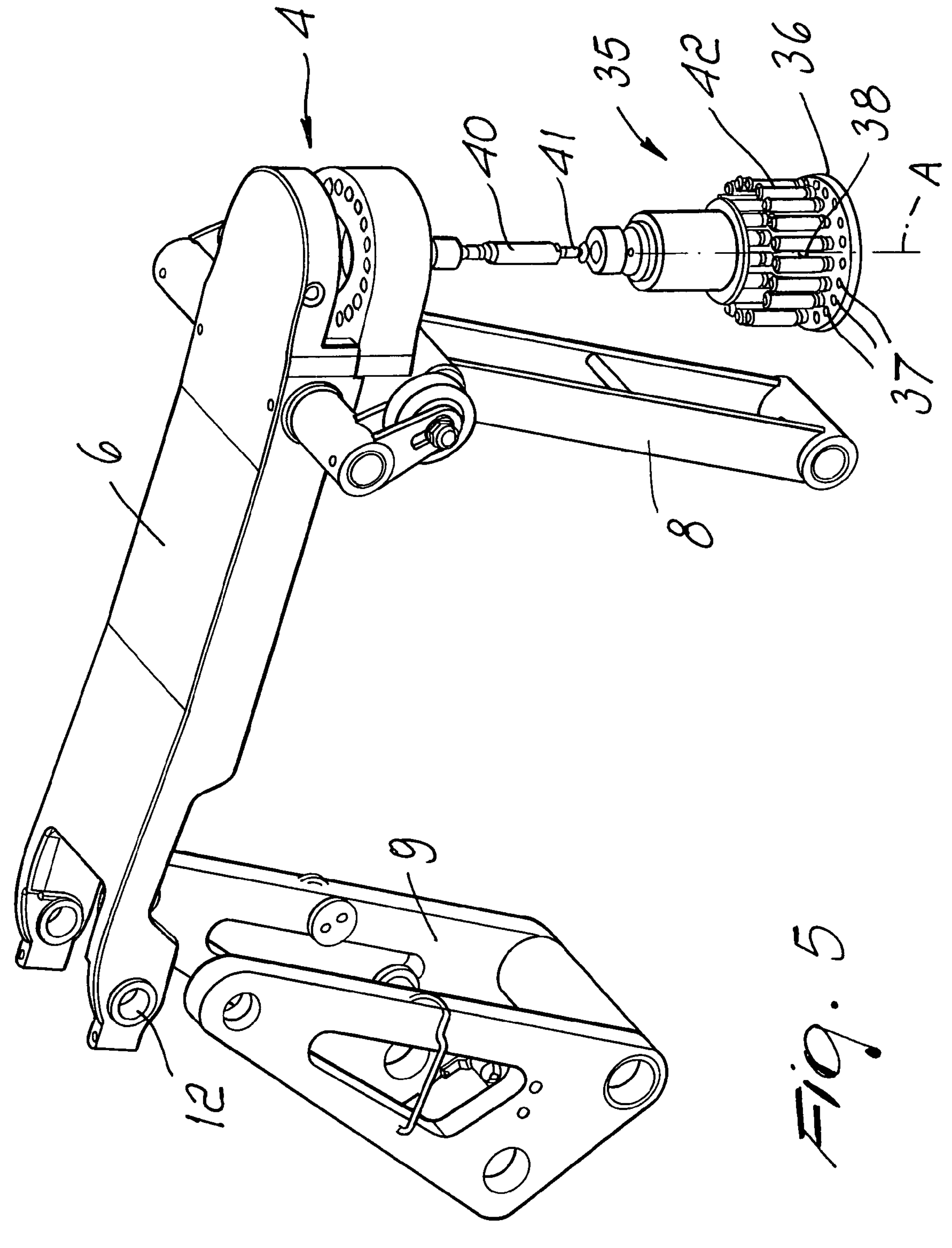
FIG. 5 is a perspective view of the jack.
Figure 6:
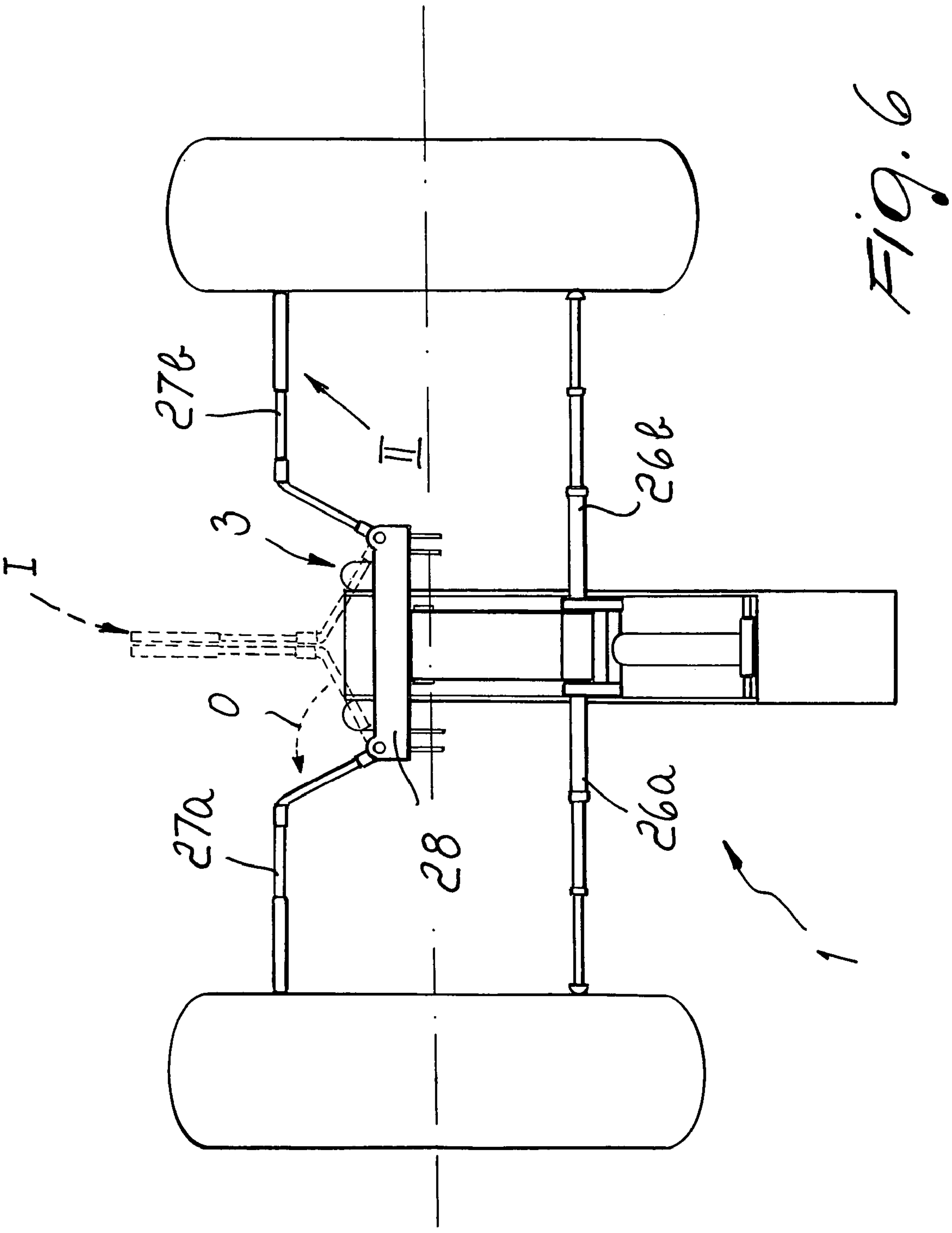
FIG. 6 is an upper, schematical view showing the jack according to the invention, in two different operative configurations.

The transverse arm 28 is articulated centrally by way of articulation means about a vertical axis A to a front arm 34 of the side 6, with the interposition of a locking assembly 35 suitable for locking at different angles, such as to achieve different steering angles (FIGS. 1 and 5).

The locking assembly 35 that provides the articulation means comprises a disk 36, which is crossed by a plurality of peripheral holes 37, which are distributed with a constant spacing, and by a central hole 38 for a hydraulic body for actuating a vertical stem 40, at the lower end of which a ring element, with a circumference formed by pins 42 aligned as in FIG. 5, is supported by means of the bolt 41, said pins being suitable to enter the corresponding holes 37 and other corresponding holes 39 distributed below the central region of the transverse arm 28 or to disengage from them, in order to mutually couple or release the transverse arm 28 and the disk 36. The pins and the holes are both preferably, but not exclusively, twenty.

When open (position I), the two clamps 27*a*, 27*b* can be at least partially inserted between internal sides of the pair of wheels of the motor vehicle to be lifted/carried, each element having an opening of its own directed toward the inner side of the corresponding wheel of the motor vehicle at a lower height than a hub of said wheel.

When they are closed (position II), the two clamps 27*a*, 27*b* each secure the corresponding wheel of the motor vehicle by means of the counter-pressure applied by the first abutment 26*a* and by the second abutment 26*b* against corresponding abutment tread portions located in opposite regions (the tread clamp portions) with respect to the hub. The pair of wheels of the motor vehicle is thus gripped by proceeding from inner sides toward the tread, without affecting in any way said wheels on their outer sides. It is thus possible to always engage the parked motor vehicle without problems even when it is adjacent to a sidewalk and in an extreme case with the outer sides of the wheels rested thereon.

Advantageously, in order to adapt the engagement device to the wheelbase of the parked vehicle and to the thickness of its wheels, the first abutments 26*a* can be extended transversely to the plane of arrangement of the corresponding wheels of the motor vehicle. This extension can be achieved by means of telescopically associated elements and/or by means of unstable elements or elements that can be associated in axial alignment with each other.

The second abutments 26*b* also can be extended as a function of the dimensions of the corresponding wheel of the motor vehicle (an embodiment with coaxial telescopic elements 43 is shown in the figures merely by way of example).

Misalignments or irregularities in the shape and size of the wheels of the motor vehicle can no longer affect dramatically the end result, and the manual maneuvers on the engagement device and the guiding maneuvers on the jack are both reduced to the minimum possible amount and are extremely simple.

The operation of the invention is intuitive; in particular, the castors (tilting wheels 14) and the adjustment of the steering angle achieved with the ring of pins 42 allow to avoid scraping against the ground during maneuvers and produce an approach to the car to be moved along a more adequate and ideal path.

Advantageously, the sequences of activation of the various working elements are controlled by a control system S with electronic and memory means, which perform sequentially the following steps: clamp opening, clamp closure, stabilizer extraction, head lock, jack lifting, stabilizer retraction, car transfer, stabilizer extraction, jack lowering, stabilizer retraction, head release, clamp closure, final stop.

It has thus been shown that the invention achieves the proposed aim and objects.

The invention thus conceived is susceptible of numerous modifications and variations, all of which are within the scope of the appended claims.

All the details may further be replaced with other technically equivalent ones.

Terms, such as horizontal, vertical, transverse, front and rear, are herein used as referred to the position of the jack shown in FIG. 1, and as an exemplary and not limitative example of mounting laying configuration.

In the exemplary embodiments shown, individual characteristics, given in relation to specific examples, may actually be interchanged with other different characteristics that exist in other exemplary embodiments. Moreover, it is noted that anything found to be already known during the patenting process is understood not to be claimed and to be the subject of a disclaimer.

The embodiment of the present invention shall be carried out in the most scrupulous compliance with the statutory and regulatory provisions related to the products of the invention or correlated thereto and following any required authorization of the corresponding competent authorities, with particular reference to regulations related to safety, environmental pollution and health.

In practice, the materials used, as well as the shapes and the dimensions, may be any according to requirements without thereby abandoning the scope of the protection of the appended claims.

The disclosures in Italian Patent Application No. BO2005A000403 from which this application claims priority are incorporated herein by reference.

What is claimed is:

1. A wheeled jack, comprising: a chassis shaped as an articulated parallelogram having a lower horizontal side and an upper horizontal side; rocker levers provided connected at a front end of said lower horizontal side on both sides thereof; two pairs of front and rear tilting wheels, provided each supported by a respective one of said rocker levers so as to be able to swivel about vertical axes thereof; supporting clamps for gripping and supporting a pair of wheels of a vehicle to be lifted; a transverse arm that supports said supporting clamps; articulation means, provided at a front end of said upper horizontal side, for connecting thereto a center region of said transverse arm; said articulation means comprising a locking assembly for locking at different angles said transverse arm upon rotation thereof about a vertical axis passing through said center region thereof.

2. The jack of claim 1, wherein said rocker lever comprises a folded metallic plate, which is formed by a substantially rectangular upper flat face that extends downward so as to form symmetrical triangular flaps.

3. The jack of claim 2, comprising two bolts, bearings, spacers and respective forks, said bolts being screwed below said flat face and supporting, with interposition of said bearings and spacers, said respective forks to which said front and rear tilting wheels are connected, so as to be able to swivel with respect to substantially vertical axes.

4. The jack of claim 1, wherein said transverse arm mounts, at ends thereof, respective additional forks and respective secondary wheels the hubs whereof are fixed along mutually opposite adjustment slots provided in said additional forks.

5. The jack of claim 1, wherein said locking assembly comprises a ring element formed of pins, a hydraulic body, and a disk, said disk being crossed by a plurality of peripheral holes distributed with a constant pitch and fitted with said hydraulic body for actuation of said ring element, with said pins being suitable to mutually couple in a locking configuration or to release said transverse arm and said disk.

6. The jack of claim 5, comprising a control unit with electronic and memory means which controls sequential configurations for: clamp opening, clamp closure, stabilizer extraction, head lock, jack lifting, stabilizer retraction, car transfer, stabilizer extraction, jack lowering, stabilizer retraction, head release, clamp closure, final stop.

7. A wheeled jack, comprising: a chassis; rocker levers provided connected to said chassis at opposit sides thereof; two pairs of front and rear tilting and swiveling supporting wheels each supported by a respective one of said rocker levers so as to be able to swivel about vertical axes thereof for ground supporting and maneuvering; abutments protruding laterally from said chassis in an intermediate part thereof; articulation means; a transverse arm articulated centrally by way of said articulation means to a front part of said chassis; and clamps supported at respective ends of said transverse arm so as to be movable from an open position in which the clamps are suitable to allow insertion of the front part of the chassis between internal sides of a pair of wheels of a vehicle to be lifted with the abutments abutting against first tread portions of the vehicle wheels, and a closed position in which the clamps secure the vehicle wheels by closing on respective tread clamp portions thereof that are located in regions that are opposite, with respect to hubs of the vehicle wheels, to said first tread portions; and wherein the articulation means comprising a locking assembly for locking said transverse arm at different steering angles.

* * * * *